Oct. 28, 1952
J. R. SPALDING
2,615,959
APPARATUS FOR MEASURING MOISTURE IN YARN
Filed Feb. 8, 1951
2 SHEETS—SHEET 1
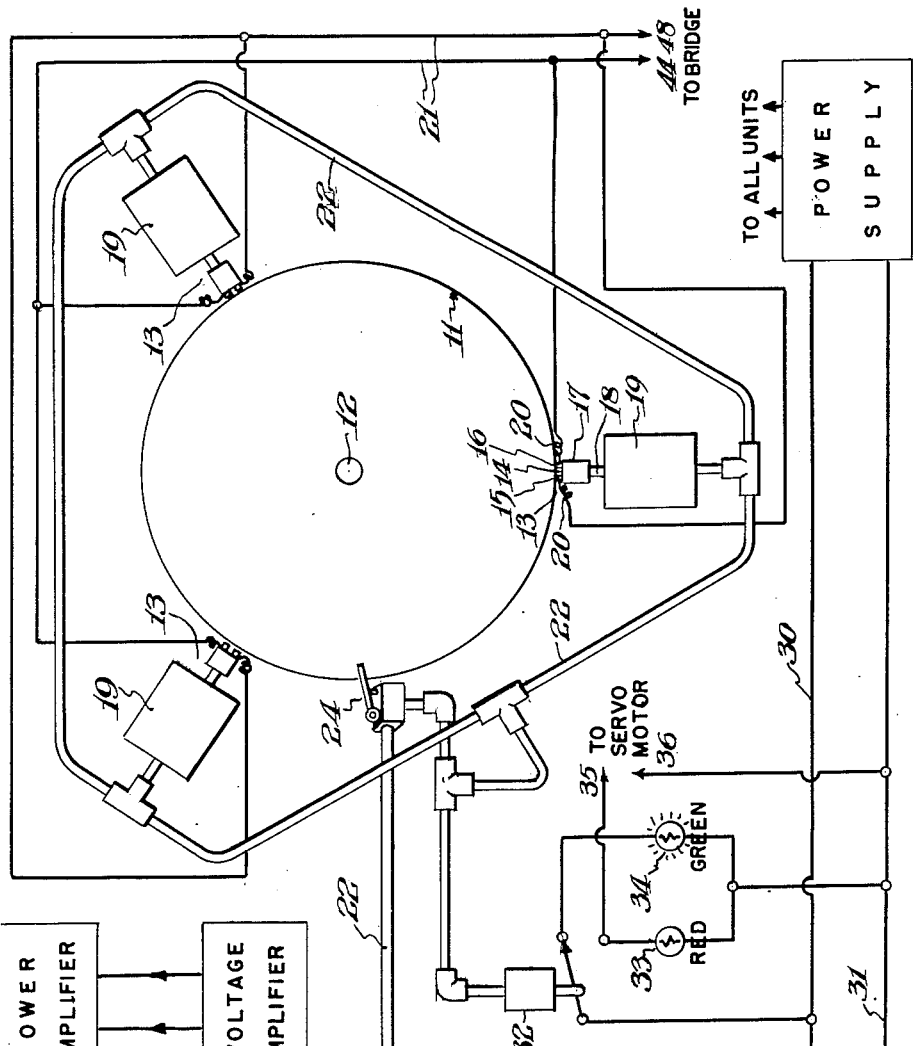
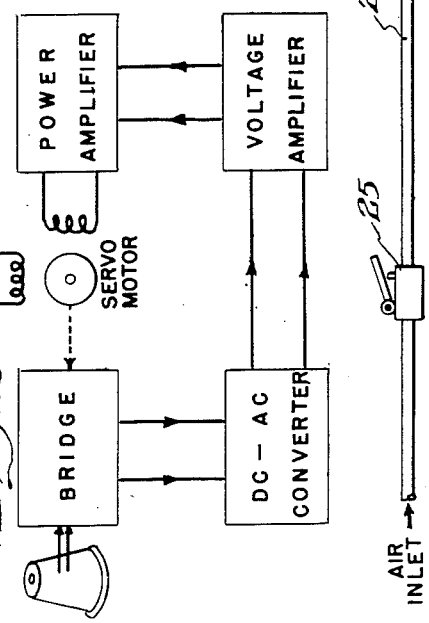
INVENTOR.
JOHN ROBERT SPALDIN
BY
Norris E. Ruckman
ATTORNEY.

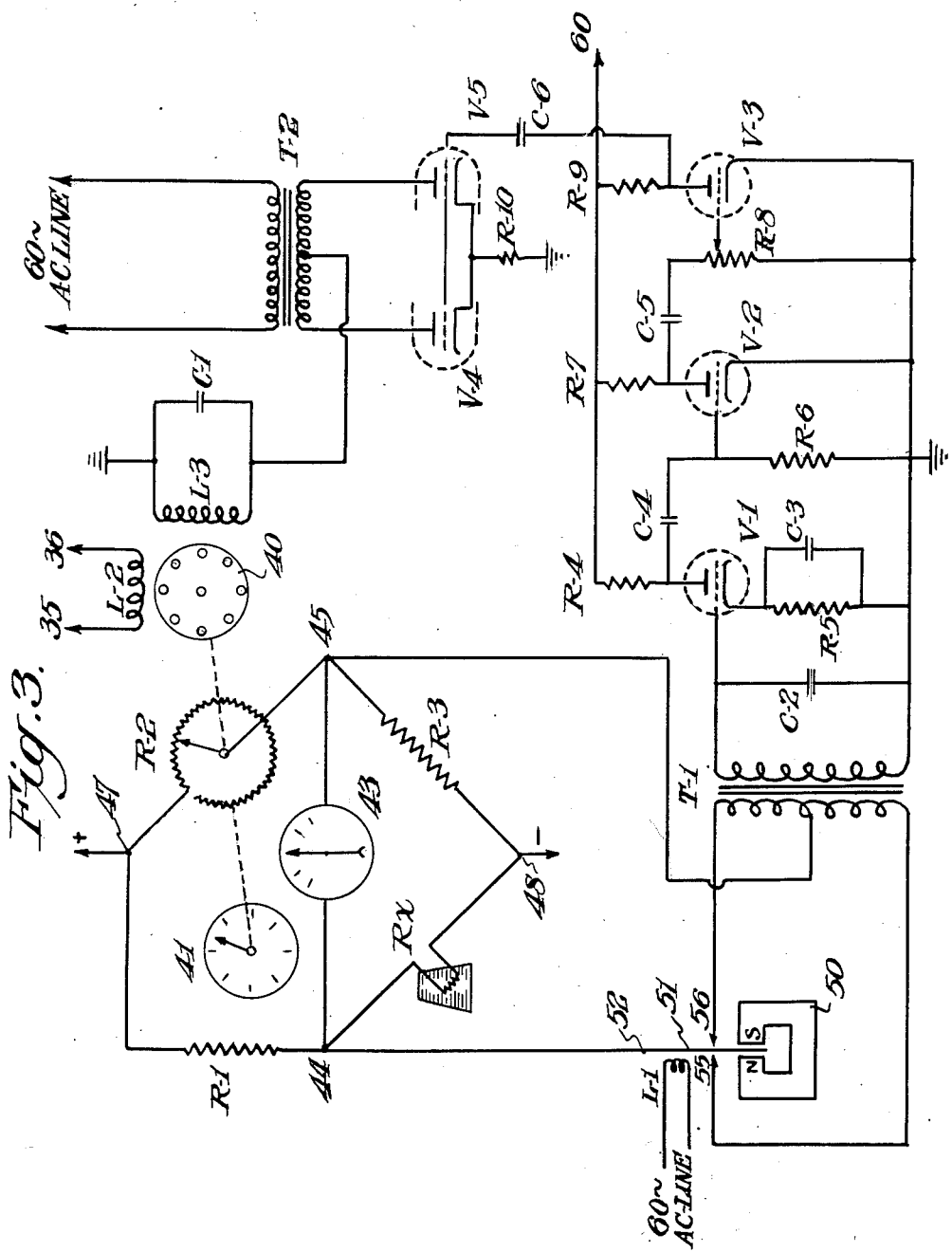

Patented Oct. 28, 1952

2,615,959

UNITED STATES PATENT OFFICE 2,615,959

APPARATUS FOR MEASURING MOISTURE IN YARN

John Robert Spalding, Kenmore, N. Y., assignor to E. I. du Pont de Nemours and Company, Wilmington, Del., a corporation of Delaware Application February 8, 1951, Serial No. 210,052

1 Claim. (Cl. 175—183)

This invention relates to apparatus for measuring moisture in yarn, e. g., the moisture in yarn on spools, pirns, cones or the like, and is more particularly concerned with electrical apparatus for determining moisture in yarn by measuring the electrical resistance of the yarn with means including a self-balancing high resistance bridge.

Sampling of rayon yarns in small packages and determining the moisture therein has always been a tedious task with uncertain results. Moisture loss or regain in rayon is rapid. If any substantial amount of time elapses between sampling and analysis, the moisture of a sample may change considerably even though reasonable precautions are taken to attempt to avoid change. Furthermore, the sample used for moisture determination is consumed in existing methods of testing, and considerable yarn production is lost in taking representative portions from a large number of packages. Even though sampling and analysis are closely timed, the results are available only after a period of many hours, because the analysis requires a long period of drying under controlled conditions.

It is an object of the present invention to provide an apparatus for making quick, almost instantaneous moisture analyses of yarn in packages, without harming the yarn package in any way and without requiring skilled analysts. Other objects of the invention will become apparent from the following description, the drawings, and appended claims.

The above objects are accomplished in accordance with the present invention by an apparatus comprising two or more closely spaced electrodes arranged to be applied to the slightly moist, and therefore conductive, yarn surface and means including a self-balancing high-resistance bridge for measuring the voltage drop across the electrode gap.

In the drawings, which illustrate preferred embodiments of the invention,

Figure 1 is a schematic arrangement of the mechanical and most closely associated electrical parts, Figure 2 is a block diagram indicating the major electrical components, and Figure 3 is a detailed electrical circuit diagram.

In Fig. 1 a package of yarn, such as a spool, pirn, or cone, is represented by circle 11. The package is mounted on a centering spindle 12 in prepartion for moisture determination. Three moisture measuring stations 13 are equally spaced around the package to provide a centering action when they grip the yarn package. Each of these three stations comprises a resistance sampling unit precisely formed with a small gap 14 between the metal electrodes 15, 16 fastened to an insulator 17, such as a plastic block, which in turn is mounted on a piston stem 18 extending into a cylinder 19. These resistance sampling electrodes are connected in parallel by flexible leads 20 and fixed leads 21 and connected to form one arm of a bridge circuit to be described subsequently.

Each cylinder 19 is supplied with air or other fluid under constant pressure through the pipeline 22. To guard against accidental operation of the moisture measuring equipment when no sample is in place, a safety valve 24 is provided in the compressed air line, which prevents flow of compressed air to the cylinders until the valve is opened by a yarn package mounted on the spindle.

The purpose of this safety valve 24 is to make the pistons inoperative until the yarn package is in the correct position. This prevents the cells from clamping the base of the package rather than the desired portion. With the safety valve 24 open, the operator opens the manual valve 25, and air (or other fluid) flows through the pipelines to the cylinders, pressing the electrodes against the side wall of the package under a uniform and constant pressure controlled by the pressure at which the fluid is supplied.

Power for the apparatus is obtained from an alternating current line, suitably a 60 cycle, 110 volt line. This is transformed as required for operation of other components of the measuring apparatus in conventional manner by a power unit indicated by the block symbol labeled "Power Supply," which is connected to the external A. C. line by leads 30 and 31. If "on-off" switch 29 in lead 30 is "on," current is already flowing to the power supply. As the compressed air forces the pairs of electrodes 15, 16 against the yarn, it also operates pressure switch 32, connecting red light 33 and one winding of a servo-motor (shown in the other figures) in parallel across the power line. The resulting red glow from the light indicates that a measurement is being taken. After making the measurement, the operator releases valve 25 and switch 32 returns to the position shown in Fig. 1, deactivating the balancing mechanism and turning on green light 34 to indicate that no measurement is under way.

In the block diagram of Fig. 2 the self-balancing system is shown as made up of four major circuits: the bridge circuit, D. C.-A. C. converter, voltage amplifier and power amplifier. This diagram is intended to convey only a general impression of how these components interact. For simplicity, the input to the bridge circuit is represented as taken off by a simple electrode pair in contact with a pirn of yarn. The actual devices used are as described above in the discussion of Figure 1. The direct-current output of the bridge is changed to alternating current with the aid of the converter and then amplified sufficiently, first in the voltage amplifier and then in the power amplifier, to operate the servomotor. This motor is operated by unbalance of the bridge and turns a contact on one resistance arm of the bridge, changing the effective resistance to whatever extent is necessary to achieve balance. The setting of this adjustable resistor is then a function of the moisture in the yarn, so its setting can be calibrated to read moisture directly.

A more complete understanding of the operation of the balance apparatus may be had by referring to the detailed circuit diagram of Figure 3. The bridge is shown at the upper left. Reading in a clockwise direction, starting in the upper left corner, the bridge comprises resistances R-1, R-2, R-3 and the unknown resistance $R_x$, presented by the moisture in the yarn being measured, connected in series. R-2 is an adjustable resistor which is shown in circuit form to suggest its function and operation. The wiper arm of resistance R-2 is connected mechanically to both the servo-motor 40 and a dial 41, which is conveniently calibrated directly in terms of percent moisture in the yarn. An indicator 43, connected across the bridge from a point 44, between resistances R-1 and $R_x$, to a point 45, between resistances R-2 and R-3, serves as a null instrument and will reveal any mislocation of the balance point. An unvarying potential difference from the power supply (indicated in Fig. 1) is applied across the bridge from between resistances R-1 and R-2, at the point 47 marked "+," to between resistances R-3 and $R_x$, at the point 48 marked "—." Any resulting unbalance potential across the indicator is transmitted to the converter, described next.

The converter changes the direct voltage output of the bridge to an alternating potential for presentation to the amplifier. It consists of an excitation coil L-1, a permanent magnet 50, and a light ferromagnetic metal strip 51, which is connected to the bridge at point 44 and is pivoted at its upper end at point 52 above coil L-1, with its movable end located between the poles N and S of magnet 50. An alternating magnetic field is set up in coil L-1 by a suitable source of alternating current, which drives the strip back and forth between the poles of the magnet in synchronism with the power line frequency. At each extent of its travel the strip 51 makes contact with one of the two points 55 or 56, thereby completing a circuit to one side or the other of the primary of transformer T-1. The other output lead from the bridge at point 45 is connected to the center of the primary winding of the transformer, so the unbalance potential from the bridge is applied alternately to the halves of the winding in opposite directions. This produces an alternating field in transformer T-1, with a strength corresponding to the output potential from the bridge. As the degree of unbalance of the bridge varies, the output of the transformer secondary varies in magnitude but not in frequency. The potential across capacitor C-2 and the secondary winding of T-2 forms the input signal for voltage amplifier tube V-1.

The voltage amplifier is a conventional three-stage cascade affair. Tubes V-1, V-2, and V-3 receive plate supply potential from the power supply through lead 60. Resistors R-4, R-7, R-9 are their respective plate dropping resistors. The heating elements for the cathodes of these tubes, as well as for those of the power amplifier discussed later, are omitted from the diagram for simplicity; they also are furnished appropriate potentials by the power supply. Cathode bias for V-1 is given by the parallel combination of resistor R-5 and capacitor C-3. V-1 amplifies the signal presented at its grid, the output being coupled by capacitor C-4 to the grid of V-2, where the magnified signal appears across grid resistor R-6. Similarly, the output of V-2 is applied to resistor R-6 at the V-3 grid through capacitor C-5. Grid resistor R-8 of V-3 is adjustable so that the desired overall amplification can be secured. From the plate of V-3, the amplified signal passes to the power amplifier through coupling capacitor C-6.

The power amplifier includes tubes V-4 and V-5, here shown as being in the same envelope. They have a common cathode resistor R-10. The input signal appears on both grids alike. The plates are driven by the potential across the secondary winding of transformer T-2, whose primary is connected across the power line. Servo-motor control winding L-3 and capacitor C-1, connected in parallel between the center tap of the T-2 secondary and ground, make up the matched load for the power amplifier. The output wave-form from the power amplifier is dependent upon the magnitude of the amplified error signal (if any). When the bridge is balanced, presenting no potential variation at the grid of the first voltage amplifier tube, the grids of V-4 and V-5 do not receive any alternating signal. Consequently, the output through the motor control winding is merely a series of current pulses at a frequency of 120 cycles per second, double the power line frequency because each half cycle of the line variation drives one plate positive, resulting in conduction through both tubes alternately during a complete cycle.

The presence of a signal at the grids of V-4 and V-5 produces an unbalance in the sizes of the two conduction pulses. A very strong signal suppresses conduction in one of the tubes completely. Thus in the presence of a large signal the power amplifier output consists simply of a burst of current during one half cycle of the line variation. The resultant in control winding L-3 may be resolved into 60-cycle and direct current components. The circuit elements are chosen in such a manner that this alternating current is in quadrature with the current in power winding L-2, thus producing a rotating magnetic field to drive the motor. On the other hand, the 120-cycle component present in L-3 at smaller (or no) error input does not produce any driving impulse in combination with the line current in L-2. Thus, for any fixed setting of resistor R-8 in the voltage amplifier, the speed of rotation of the servo-motor is determined primarily by the size of the 60-cycle component in L-3.

The direction of rotation of the servo-motor is determined by the direction of potential gradient across the two bridge output leads. It can be seen that if resistance R-1 forms a smaller fraction of the $R_x$ plus R-1 side of the bridge than resistance R-2 does of the R-2 plus R-3 side, then the potential gradient through indicator 43 will be directed from point 44 to point 45. Winding L-3 of the servo-motor is connected to the power amplifier with proper polarity to cause the motor to rotate so as to decrease the effective resistance of R-2 in such a case. As the resistance of R-2 becomes smaller, the output from the bridge becomes smaller, decreasing the 60 cycle component in the power amplifier output, and the rate of rotation of the motor decreases. When enough resistance is cut out of the R-2 arm so that there is no potential difference across the indicator there is no output from the bridge, and thus no line frequency component present in L-3. The motor stops, and the operator then reads percent moisture directly from dial 41. This completes the measurement.

Many refinements may be introduced into these electronic components without substantially varying the method or principle of operation. For example, although the bridge is represented here as a simple Wheatstone type with a single adjustable resistor R-2 and a galvanometer indicator, a more elaborate device with many specially wound resistors, and perhaps a vacuum-type voltmeter indicator, may be used. A commercially available instrument that has been found satisfactory as the bridge component is the General Radio Company megohm bridge, Type 544B. Similarly, more numerous and more complex amplification stages may be introduced. Various ranges of moisture to be measured will place different demands of stability and sensitivity upon the entire apparatus.

The usefulness of this invention may easily be recognized from the fact that it permits several moisture measurements to be made in a minute, the time for checking each package of yarn being only a few seconds. This means that a sample of yarn from the winding machine can be tested and the result given to the operator within a very short time. Consequently adjustments of operating conditions may be made rapidly enough to keep the moisture within very narrow limits, such as plus or minus one-half per cent from the desired level. This represents quite an improvement over the customary technique of oven drying samples for control, which introduced an irreducible lag of several hours before the results could be known. Furthermore, the samples tested as described herein are not deleteriously affected in any way; they may be returned to the production channels for further processing and eventual sale.

Since many different embodiments of the invention may be made without departing from the spirit and scope thereof, it is to be understood that the invention is not limited by the specific illustrations except to the extent defined in the following claim.

What is claimed is:

Apparatus for determining the moisture content of yarn in packages by measuring the electrical resistance of the yarn which comprises two electrodes arranged to be applied to a yarn package in closely spaced relationship to form a circuit which includes the resistance of a sample of yarn material of predetermined thickness, fluid-operated means for applying said electrodes to the yarn package under pressure, measuring means for determining the moisture content of the sample including a self-balancing, high resistance bridge circuit connected to said electrode circuit and cooperating means for indicating values corresponding to the moisture content of the sample when the bridge is balanced, fluid-operated switch means for supplying power to said measuring means only while said electrodes are in position against a yarn package, a conduit for supplying fluid under pressure to both of said fluid-operated means, and a fluid valve in said conduit adapted to be opened by the placing of a yarn package in position for test.

JOHN ROBERT SPALDING.

REFERENCES CITED

The following references are of record in the file of this patent:

UNITED STATES PATENTS

| Number | Name | Date |
|---|---|---|
| 1,610,563 | McIlvaine | Dec. 14, 1926 |
| 1,648,899 | Hayman | Nov. 15, 1927 |
| 2,215,805 | Wills | Sept. 24, 1940 |
| 2,270,732 | Jones | Jan. 20, 1942 |
| 2,385,481 | Wills | Sept. 25, 1945 |